United States Patent [19]

Clarke

[11] Patent Number: 4,488,057
[45] Date of Patent: Dec. 11, 1984

[54] AC-DC SWITCHING REGULATOR UNINTERRUPTIBLE POWER SUPPLY

[75] Inventor: Patrick W. Clarke, Murray Hill, N.J.

[73] Assignee: OPT Industries, Inc., Phillipsburg, N.J.

[21] Appl. No.: 513,842

[22] Filed: Jul. 15, 1983

[51] Int. Cl.³ .............................................. H02J 9/06
[52] U.S. Cl. ...................................... 307/66; 307/46
[58] Field of Search .................... 307/44, 46, 64, 66, 307/130, 131; 363/21, 56; 323/285

[56] References Cited

U.S. PATENT DOCUMENTS

| | | | |
|---|---|---|---|
| 4,038,559 | 7/1977 | Chun et al. | 307/64 |
| 4,150,424 | 4/1979 | Nuechterlein | 363/56 X |
| 4,177,389 | 12/1979 | Schott | 307/64 |
| 4,238,690 | 12/1980 | Clarke | 307/44 |
| 4,389,702 | 6/1983 | Clemente et al. | 363/56 X |

Primary Examiner—A. D. Pellinen
Assistant Examiner—Derek Jennings
Attorney, Agent, or Firm—Arthur L. Lessler

[57] ABSTRACT

A power supply for a load such as a computer, which is sensitive to power interruptions. A switching regulator is coupled to both the AC power line and a rechargeable battery, and makes automatic transitions between AC operation and battery operation, utilizing a transistor switch and an energy storage transformer coupled to both power sources and to the load. The transistor switch is driven by a variable duty cycle control signal provided by a programmed current feedback circuit responsive to both output voltage and instantaneous switch current. The feedback circuit cuts off the switch each time the peak current through the switch reaches a value corresponding to the desired output voltage—thus improving control loop stability and maintaining a constant peak current through the switch to substantially eliminate ripple. The circuit enables one terminal of the battery to be connected to one terminal of the switching transistor, to minimize noise. A charging circuit recharges the battery whenever the AC power line is operating within normal limits.

17 Claims, 3 Drawing Figures

AC-DC SWITCHING REGULATOR UNINTERRUPTIBLE POWER SUPPLY

BACKGROUND OF THE INVENTION

This invention relates to a switching regulator power supply capable of operation from either an AC or a DC power source; and to means enabling such a power supply to effect transitions between said power sources without significant interruption.

Due to the sensitivity of modern electronic equipment to interruption of the power supplied thereto, attention has been given to the development of so-called uninterruptible power supplies capable of operating from the AC power line under normal conditions, and of immediate transition to operation from a DC power source such as a battery when the AC power line voltage drops to zero (power failure) or below its normal value (power "brownout"). Such power supplies have usually been of the variable duty cycle switching regulator type.

One such type of uninterruptible power supply is described in U.S. Pat. No. 4,038,559; and an improved type of uninterruptible power supply is described in U.S. Pat. No. 4,238,690 [the drawbacks of the circuit of U.S. Pat. No. 4,038,559 being summarized in the introductory portion of U.S. Pat. No. 4,238,690]. The present invention is an improvement on the type of uninterruptible power supply described in the latter patent; and aspects of the present invention relating to the improved stability realized by its programmed current feedback circuit are analyzed in applicant's paper published in March 1983 and entitled "A New Switched-Mode Power Conversion Topology Provides Inherently Stable Response", presented at POWERCON 10—Tenth International Solid-State Power Electronics Conference and Exhibit, San Diego, Calif.

Most modern electronic circuits, such as computers, data terminals and communication equipment, require a quite reliable DC power source. In many cases, it is required that the supply of DC power to the load be uninterrupted even when the AC power line has failed or is subject to brownout. This requires a system which includes, in addition to the primary AC power source, a reserve power source such as a battery.

Rectifiers connected to the commercial AC power line contain harmonics of the (usually 50 Hz. or 60 Hz.) AC line frequency ("ripple") in the rectifier output voltage and current. These harmonics are generally reduced in prior art designs by means of large and costly filter components.

U.S. Pat. No. 4,238,690 is representative of the present state of the art in the design of uninterruptible power supplies which seek to meet the aforementioned requirements. The uninterruptible power supply of U.S. Pat. No. 4,238,690 utilizes a highly reactive linear power transformer, rectifying diodes and a switching regulator network which closely resembles a DC to DC buck-boost type switching regulator. A semiconductor switch is connected in common to both the power transformer/rectifying diode combination and the switching regulator network. Pulse width (i.e. variable duty cycle) modulation of the semiconductor switch controls the flow of power in the system.

In the circuit of U.S. Pat. No. 4,238,690, when the commercial AC line voltage is equal to or above its normal minimum value, energy is caused to flow from the AC line to the load. When the AC power falls below said minimum value, the semiconductor switch changes duty cycle, causing the energy for the load to be drawn from a battery connected to the switching regulator network.

The circuit described in this patent, however, suffers from certain drawbacks, viz:

a. In the circuit of U.S. Pat. No. 4,238,690 the direction of energy flow is controlled by adjusting system parameters; however, this arrangement presents a difficult control design problem, since the semiconductor switch is operated off-ground. Noise generated by the system can cause the semiconductor switch to malfunction and cause a system failure.

b. R. D. Middlebrook and Slobodan Cuk, in their treatise on "Advances in Switched Mode Power Conversion", Volumes 1 and 2, Tesla Co., Pasadena, Calif., have shown that buckboost circuit topologies—a class to which the circuit of U.S. Pat. No. 4,238,690 belongs—contain zeros in the right-half plane of the control to output transfer function. Such zeros cause instability in a regulated power supply system. Thus the regulating system disclosed in U.S. Pat. No. 4,238,690 is inherently unstable and therefore unsatisfactory for its intended use.

c. In the above patent, the relationship between the power transformer input voltage and the secondary output voltage is strictly a function of the duty cycle of the semiconductor power switch, defined as the ratio of the switch "on" time to the switching period. When the secondary output voltage is low (such as 5 volts—required by many computers, data modems and other logic circuits), the current in the semiconductor switch is high, adversely affecting the reliability and operating temperature range of the switch. This high switch current could possibly be reduced by adding a secondary winding to inductor 14 of the circuit shown in the aforementioned U.S. Pat. No. 4,238,690. The addition of this winding would, however, result in another problem, since energy trapped in the primary leakage reactance of such an arrangement, would be discharged across the semiconductor switch. Usually, the magnitude of this energy exceeds that which can be safely discharged by the switch, and some auxiliary means of absorbing all or a major portion of the energy is required. Snubber networks must then be used to dissipate this energy as heat to reduce the stress on the semiconductor switch. The energy released as heat lowers the overall efficiency of the power supply.

Accordingly, an object of the present invention is to provide an improved power supply capable of utilizing both AC and DC power sources; and an uninterruptible power supply overcoming drawbacks of the aforementioned prior art power supplies.

SUMMARY OF THE INVENTION

As herein described, according to one aspect of the invention there is provided an uninterruptible power supply, comprising: inductive means for coupling power from an AC power source; a rectifier coupled to said inductive means; a switching device having first and second main terminals coupled to said rectifier, and a control terminal; control signal generating means for applying periodic control signals to said control terminal of said switching device to alternately render said switching device conductive and nonconductive between said main terminals thereof, the duty cycle of said control signals being variable; a pair of output terminals adapted for connection to a load; and an energy storage transformer having a primary winding and a secondary winding, said primary winding being coupled to said first main terminal of said switching device and being adapted to be coupled to a non-periodic power source, said secondary winding being coupled to said output terminals, said energy storage transformer (i) receiving energy from said AC power source via said inductive means when the voltage of said AC power source is at least equal to a predetermined threshold value, and (ii) receiving energy from said non-periodic power source when the voltage of said AC power source is below said predetermined threshold value.

According to another aspect of the invention there is provided a regulated power supply, comprising: a switching device having first and second main terminals and a control terminal; control signal generating means for applying periodic control signals to said control terminal of said switching device to alternately render said switching device conductive and nonconductive between said main terminals thereof, the duty cycle of said control signals being variable; a pair of output terminals adapted for connection to a load; an energy storage transformer having a primary winding and a secondary winding, said primary winding being coupled to said first main terminal of said switching device and being adapted to be coupled to a non-periodic power source, said secondary winding being coupled to said output terminals; and a programmed current feedback circuit responsive to the voltage across said output terminals and to the current through said switching device between the main terminals thereof, said current feedback circuit being coupled to said control signal generating means for varying the duty cycle of said control signals to maintain (i) the voltage across said output terminals at a predetermined desired value and (ii) the peak current through said switching device at a preset constant value.

IN THE DRAWING

DESCRIPTION OF PREFERRED EMBODIMENTS OF THE INVENTION

System Description

In the circuits herein described, a power switch, a battery and an output circuit are all operated with a common ground system. Programmed current feedback is employed to provide a stable regulating system; to reduce harmonic ripple voltages of the AC input frequency virtually to zero, and to reduce the control to output transfer function from an unstable fourth order system to a stable first order system.

Figure 1:
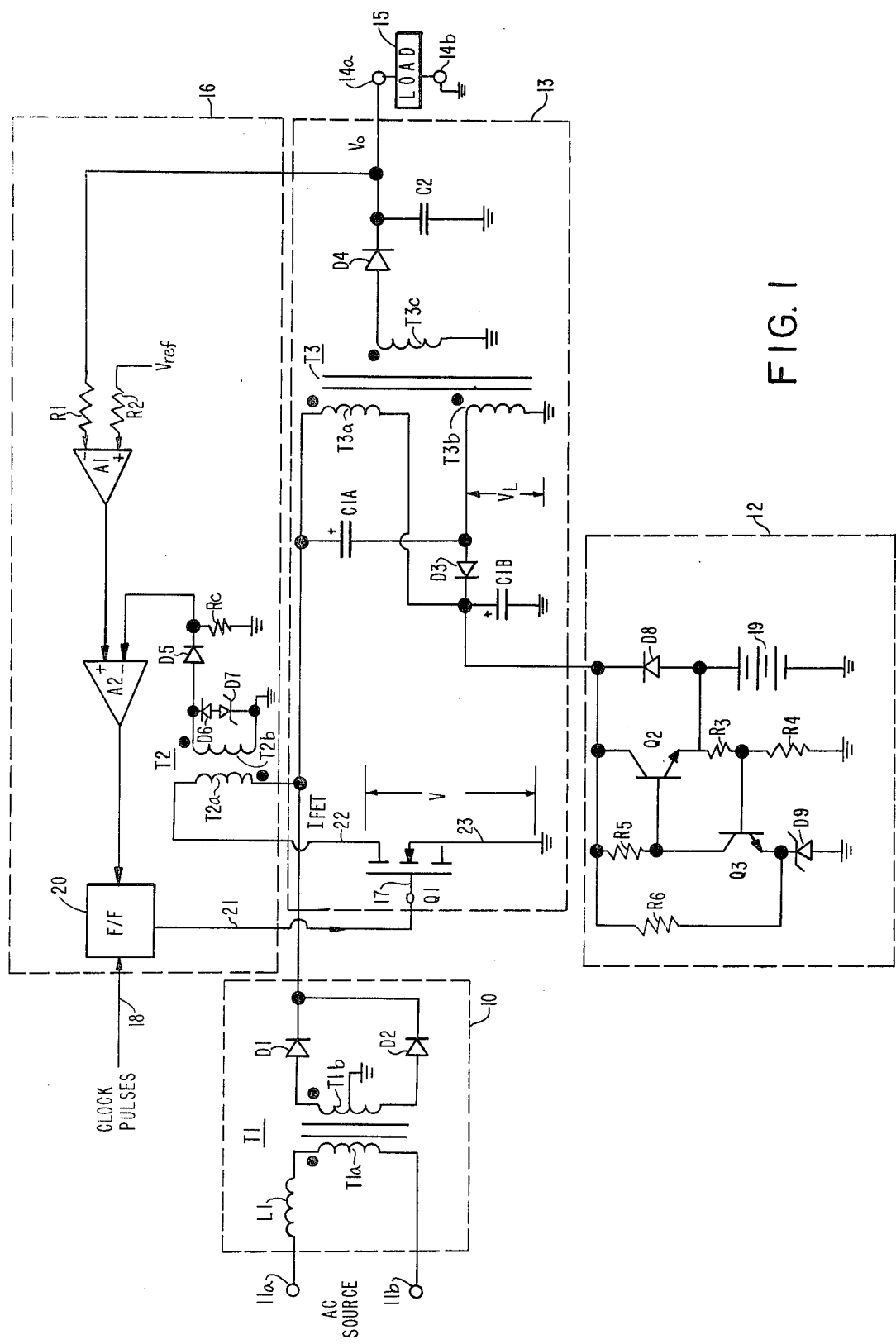
FIG. 1 is a schematic diagram of an uninterruptible power supply according to a preferred embodiment of the invention.

The uninterruptible power supply of FIG. 1 has parameters selected such that when the AC line voltage is equal to or above its minimum normal operating value, the energy required by the load is derived from the AC power line. Under these conditions, the battery is in a standby mode, supplying no energy to the system. The control circuit maintains the correct duty cycle for the semiconductor switch to cause the output voltage to assume its desired value.

When the AC line voltage drops below its minimum normal operating value (or fails entirely), this condition is sensed by the control circuit, which alters the duty cycle so that the required energy can be supplied from the battery to the load. The transition to battery operation is smooth, with very little disturbance to the load. Upon return of the AC line voltage to at least its minimum normal value, the control circuit readjusts the duty cycle to extract the energy for the load solely from the AC power source. The battery is now in a discharged state and is recharged from the AC power source by means of a self-contained charging circuit.

Figure 3:
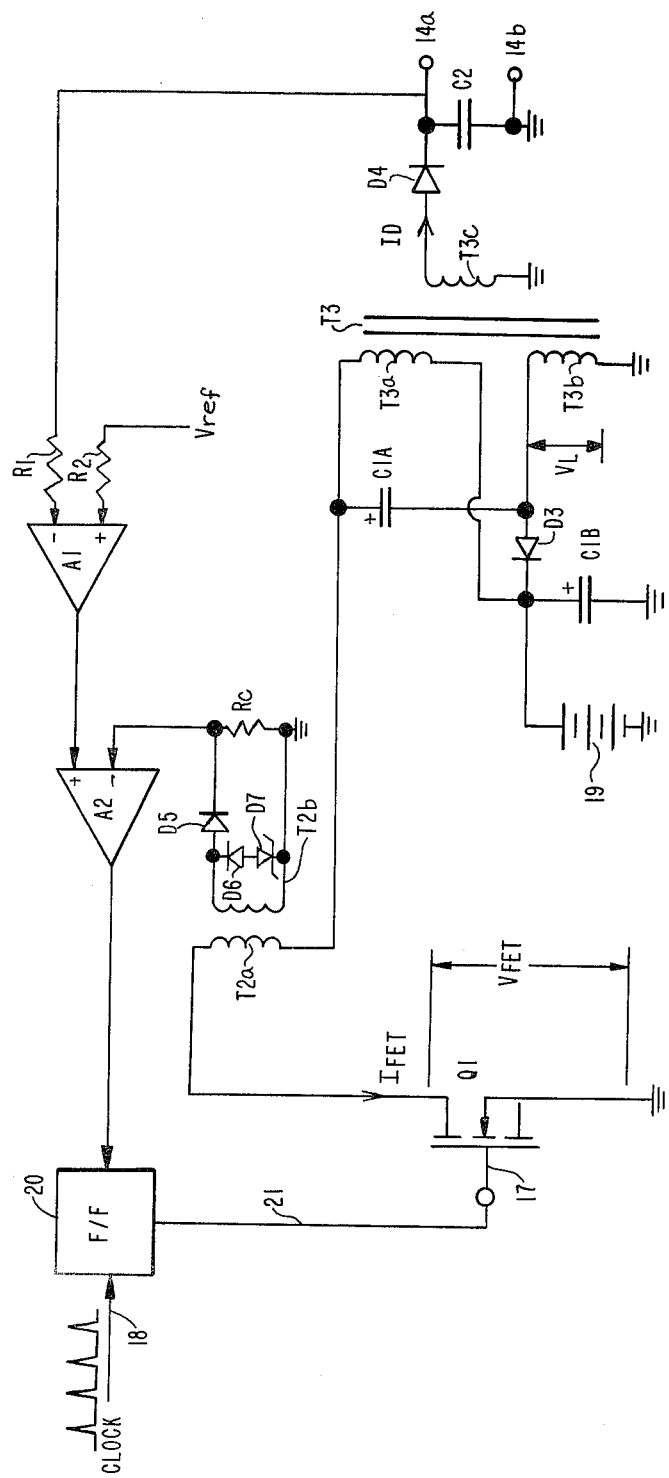
FIG. 3 is a schematic diagram of a DC to DC converter according to another embodiment of the invention.

FIG. 3 shows a DC to DC (i.e. battery operable) version of the circuit of FIG. 1, which is essentially the same as the circuit of FIG. 1, with the omission of the AC power transformer and its associated rectifier, and the battery charger.

The circuits shown in FIGS. 1 and 3 incorporate a programmed current feedback system to cancel the right-half plane zeros in the control-to-output transfer functions, resulting in a stable regulated power supply system. In these circuits, programmed current feedback is used to reduce the line frequency harmonic voltage and current ripple to virtually zero. Consequently, much smaller and less costly filter components are used than are required in prior art power supplies employing switching regulators of the buck-boost type. This result has been documented in the aforementioned paper presented at POWERCON 10—Tenth International Solid-State Power Electronics Conference and Exhibit, March 1983, in San Diego, Calif.

The circuits shown in FIGS. 1 and 3 eliminate the need for a snubber network to absorb excess energy stored in the leakage reactance of the energy storage transformer, by an arrangement of split primaries on said energy storage transformer, the secondary of which supplies energy to the load. The energy in the primary leakage reactance of the energy storage transformer is transferred to a pair of capacitors, where it is stored and returned to the system during the next cycle of the circuit.

Detailed Circuit Description

The uninterruptible power supply shown in FIG. 1 comprises a high reactance (or high leakage) transformer-rectifier 10 receiving power from an AC source at input terminals 11a and 11b; a battery and battery charger section 12; a switch-mode regulator circuit 13 for receiving power from the transformer-rectifier 10, receiving power from and (at other times) delivering power to the battery and battery charger 12, and having output terminals 14a and 14b for connection to a load 15; and a programmed current feedback circuit 16 responsive to clock pulses on input line 18 (from a source independent of the condition of the AC source connected to terminals 11a and 11b) for sensing the voltage across the load 15 and the instantaneous current flow through the field-effect transistor switch Q1, and controlling the operation of the switch Q1.

The transformer-rectifier 10 consists of a power transformer T1 having a primary winding T1a and a center-tapped secondary winding T1b. The secondary winding is connected to a full-wave rectifier comprising diodes D1 and D2. A choke L1 is connected in series with the primary winding and has an inductance selected to provide a low reactance at the frequency of the AC power source (typically 50 Hz. or 60 Hz.) and a high reactance at the frequency of the clock pulses on line 18 (typically in the range of 10 KHz. to 100 KHz.) to prevent high frequency noise from the regulator 13 from entering the AC power line.

The choke L1 may be eliminated as a separate circuit element by designing the power transformer T1 to provide a primary leakage reactance substantially equal to the desired reactance of the choke L1. The turns ratio of the primary and secondary windings of the transformer T1 is selected to provide the required secondary voltage to rectifying diodes D1 and D2.

A source of back-up energy is contained in the battery 19 of the battery and battery charger block 12.

When the AC line voltage at terminals 11a and 11b is equal to or greater than its minimum normal value (typically 95 volts rms in the United States), diode D8 is reverse biased so that no current flows out of the battery 19, and all of the system energy is derived from the AC power line.

The network consisting of transistors Q2 and Q3, resistors R3, R4, R5 and R6, and Zener diode D9 comprises a battery charging circuit. When diode D8 is reverse biased, transistor Q2 is forward biased and conducts current to charge the battery 19. Resistor R5 provides base current to transistor Q2 to keep it in the conducting state. Series resistors R3 and R4 are connected across the battery 19 and act as a voltage divider to provide a voltage proportional to the battery voltage at the base of transistor Q3. The emitter of transistor Q3 is referenced to ground, through Zener diode D9.

When the battery voltage reaches a value corresponding to the fully charged state of the battery 19, the voltage feedback to the base of transistor Q3 will be approximately equal to (and slightly greater than) the reference voltage across reference diode D9, causing transistor Q3 to begin to divert current away from the base of transistor Q2, thus reducing the battery charging current. Eventually, equilibrium conditions will be achieved and the current in transistor Q2 will be just sufficient to maintain the battery 19 in a fully charged state.

When the AC line voltage at terminals 11a and 11b drops below its minimum normal value (or disappears entirely), diode D8 becomes forward biased (thus reversing the collector-to-emitter voltage of transistor Q2 and thereby disabling the battery charging circuit), and the battery 19 discharges to supply operating power to the regulator 13 and load 15.

The switch-mode network 13 alternatively accepts energy from either the AC power line or the battery 19. Capacitors C1A and C1B are charged from either the transformer rectifier 10 or the battery 19. When the AC line voltage at terminals 11a and 11b is at least equal to its minimum normal value, the voltage provided from the transformer-rectifer 10 to charge capacitor C1B is higher than the voltage of battery 19, thus reverse biasing diode D8.

Switching transistor Q1 has a control or gate electrode 17 which receives a variable duty cycle drive signal pulse train from flip-flop 20 of current feedback circuit 16 on line 21, at the frequency of the clock pulses on line 18.

When transistor switch Q1 is conductive or "on", the main terminals 22 and 23 of the switch Q1 are essentially interconnected to momentarily short-circuit the secondary winding T1b of power transformer T1 to prevent any change in its magnetic flux linkages (the impedance presented by the series-connected primary winding T2a of current transformer T2 being negligible), and energy is drawn from the line and stored in the magnetic field of transformer T1. During this interval when the switch Q1 is conductive, the following additional events occur:

(i) Both capacitors C1A and C1B are connected across both primary windings T3a and T3b of energy storage transformer T3 through switch Q1;

(ii) The voltage developed across the secondary winding T3c of energy storage transformer T3 is less than the voltage across filter capacitor C2, so that rectifying diode D4, connected to the secondary winding T3c of energy storage transformer T3, is reverse biased;

(iii) Filter capacitor C2, connected to the output of rectifying diode D4 and across the load 15, discharges through the load to supply energy to the load and maintain the output voltage across the load; and (iv) Capacitors C1A and C1B discharge through primary windings T3a and T3b to store energy in the magnetic field of energy storage transformer T3.

When switch Q1 is turned "off" and becomes non-conductive, the following events occur:

(v) The fly-back action of the secondary winding T3c of energy storage transformer T3 forward biases diode D4 and said secondary winding discharges to recharge filter capacitor C2, to supply energy to the load, and to maintain the output voltage across the load; and (vi) The secondary winding T1b of power transformer T1 releases the energy stored in the magnetic field of transformer T1 by discharging through diodes D1/D2 to recharge capacitors C1A and C1B through windings T3b and T3a respectively of energy storage transformer T3. Q1 is switched at a constant rate to transfer energy through the system.

The output voltage at terminals 14a and 14b is regulated by controlling the ratio of the "on" time of switch Q1 to the total period of the control signal at gate electrode 17, i.e. the duty cycle, by means of pulse width modulation, with the flip-flop 20 acting as the modulator.

During each period of the control signal on line 21 applied to gate electrode 17, the energy trapped in the magnetic field associated with leakage inductance of primary windings T3a and T3b of energy storage transformer T3 appears as a positive voltage at the dotted ends of said windings. This voltage generated by primary winding T3a is clamped by capacitor C1A through diode D3; and in the same way the corresponding voltage generated by primary winding T3b is clamped by capacitor C1B. These capacitors are of relatively large capacitance and absorb this energy with only a small increase of voltage; therefore the voltage appearing across switch Q1 is limited to the sum of the voltages across capacitors C1A and C1B, which is designed to be below the maximum voltage which switch Q1 can withstand across its main terminals 22 and 23.

The energy so absorbed by capacitors C1A and C1B is returned to the system during the next "on" pulse of switch Q1. In effect, the circuit performs as a snubber to absorb excess energy so that the switch Q1 is not required to do so, without the attendant energy loss of prior art snubber networks.

The switch-mode regulator 13 belongs to the buck-boost class of circuits, which contains a zero in the right-half plane of the control to output transfer function. A stable regulating system cannot be designed unless this zero can be compensated for or cancelled.

The programmed current feedback circuit 16 is employed to cancel the effect of this zero, resulting in a stable regulating system. This current feedback circuit consists of reference differential amplifier A1, differential input operational amplifier A2, flip-flop 20, current transformer T2, diodes D5 and D6, Zener diode D7, and resistors R1, R2 and Rc. Reference amplifier A1 compares the output voltage across terminals 14a and 14b to a reference voltage $V_{ref}$ to generate an error voltage e, which is applied to the positive input terminal of operational amplifier A2.

When switch Q1 is conductive or "on", the (rising) current flowing through the main electrodes 22 and 23 of switch Q1 also flows through the primary winding T2a of current sensing transformer T2. A voltage proportional to this current is transformed to the secondary winding T2b, rectified by diode D5, and appears as a rising voltage across current sensing resistor $R_c$. At the moment in time when the sensed voltage across resistor $R_c$ is equal to the error voltage e, the output of operational amplifier A2 suddenly changes or "switches" to reset flip-flop 20, which had been set by the immediately preceding clock pulse on line 18.

The flyback voltage developed across secondary winding T2b is limited by diodes D6 and D7.

When flip-flop 20 is reset, the gate signal to switch Q1 is terminated and turns switch Q1 "off". Switch Q1 remains "off" until the next clock pulse on line 18 resets flip-flop 20 to cause its output to go high to again provide gate voltage for switch Q1 to turn it "on".

The output of flip-flop 20 thus is a drive pulse having a leading (turn-on) edge corresponding to the occurrence of each clock pulse, a trailing (turn-off) edge occurring when the peak current through the main electrodes of switch Q1 reaches a value corresponding to the desired output voltage across the load, and a varying pulse width (i.e. a varying duty cycle).

The clock pulse train on line 18 is periodic at the desired pulse rate, typically in the range of 10 KHz. to 100 KHz. Thus, each clock pulse turns switch Q1 "on", and the switch remains "on" until its current reaches a level proportional to the error voltage at the output of amplifier A1; at which time switch Q1 is turned "off". This process automatically establishes the required duty cycle to maintain the output voltage at terminals 14a and 14b at its desired regulated value.

Figure 2:
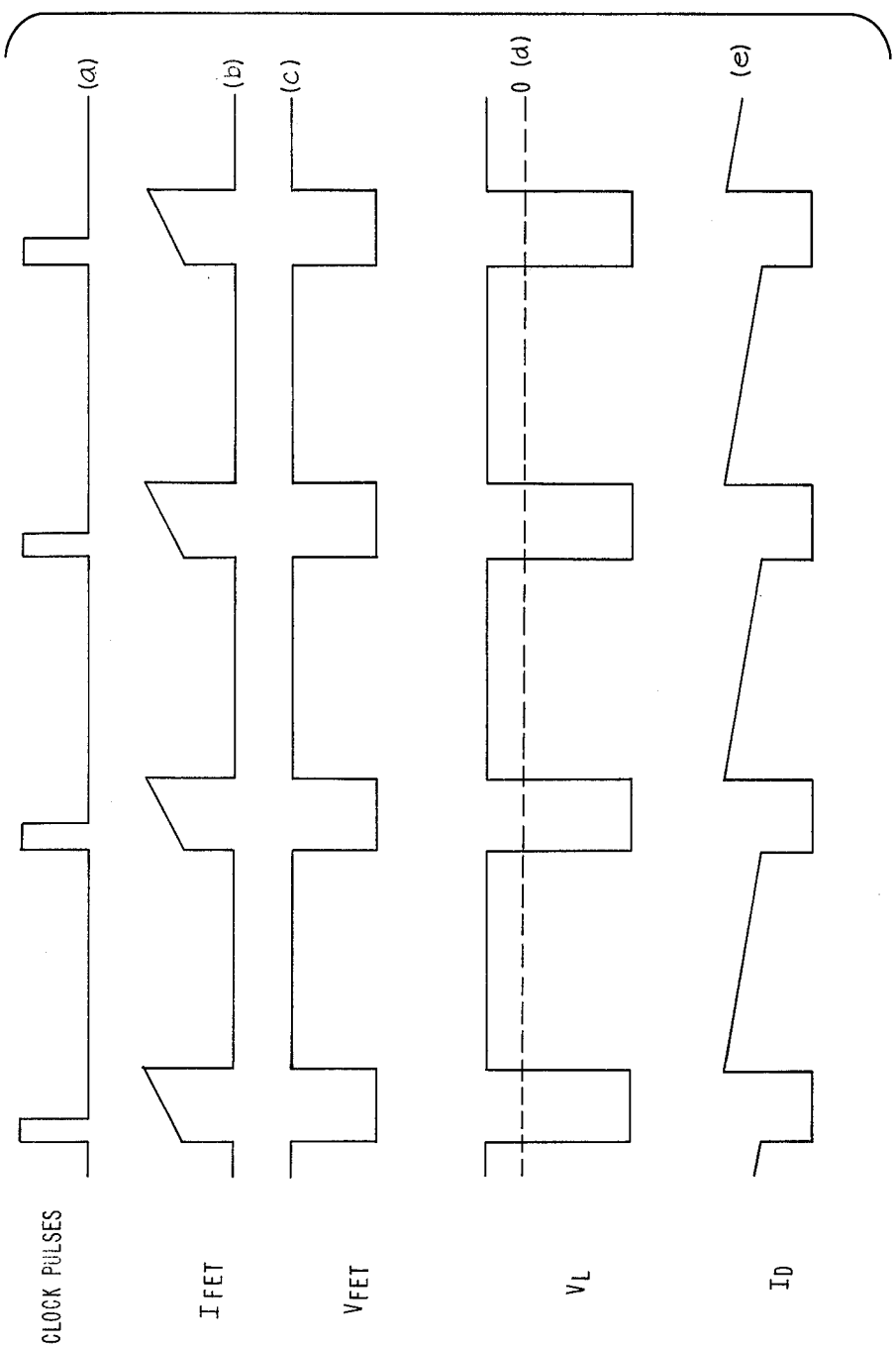
FIG. 2 shows waveforms associated with the operation of the circuit shown in FIG. 1.

By maintaining the peak current in switch Q1 constant and turning the switch on and off at a fixed rate, the current feedback circuit 16 causes the peak to peak value of the current in diode D4 to remain fixed, and to contain only harmonics of the switching frequency, i.e. of the frequency of the clock pulses on line 18. This is shown in the waveforms of FIG. 2, where:

Waveform (a) shows the clock pulses on line 18;

Waveform (b) shows the current between the main terminals of switch Q1;

Waveform (c) shows the voltage across the main terminals of switch Q1;

Waveform (d) shows in solid lines the voltage across secondary winding T3c of energy storage transformer T3, and in dashed lines a zero reference voltage level; and Waveform (e) shows the current through diode D4.

Thus harmonics of the AC line frequency do not appear in the output ripple. Filter capacitor C2 is relatively small and only designed to reduce ripple voltages due to harmonics of the switching frequency to the required levels.

The programmed current feed back arrangement described above provides improved control loop stability by cancelling the right-half plane zeros of the control-to-output transfer function, as shown in a paper titled, "A New Switched-Mode Power Conversion Topology Provides Inherently Stable Responses", by Patrick W. Clarke, and reported at POWERCON 10—Tenth International Solid State Power Electronics Conference and Exhibit, March 1983, San Diego, Calif. Thus the use of programmed current feedback in the circuit shown in FIG. 1 serves to both reduce harmonics of the AC power line frequency in the output voltage supplied to the load, and to provide a stable feedback control system.

When the AC power line is supplying power to the regulator 13, the capacitor C1B acts as a secondary power source to charge the battery 19 via the battery charger previously described.

When the AC voltage fails or falls below its minimum normal value, the capacitors C1A and C1B receive their energy from the battery 19 rather than from transformer-rectifier 10. However, the operation of the regulator 13 and current feedback circuit 16 remains essentially the same as during AC powered operation, except of course that the duty cycle of the pulses supplied to switch Q1 on line 21 will be automatically changed by the current feedback circuit to reflect any difference between the voltage of the battery 19 and the voltage which had been developed at the output of the transformer-rectifier 10.

The regulator 13 thus acts (under the control of the current feedback circuit 16) as a DC to DC converter capable of utilizing either the DC power from the transformer-rectifier 10 or the DC power from the battery 12, and having the capability of automatically switching back and forth between said power sources. It is therefore evident that this circuit can be utilized as a DC to DC converter operating from either of these power sources alone.

FIG. 3 shows such an arrangement, i.e. a DC to DC version of the circuit which is identical to that shown in FIG. 1, except for omission of the transformer-rectifier 10 and the battery charger. The circuit of FIG. 3 functions in exactly the same manner as the circuit of FIG. 1 operating in its battery-powered mode.

I claim:

1. An uninterruptible power supply, comprising:

a power transformer having a primary winding adapted to be connected to an AC power source, and a secondary winding;

a first rectifier connected to said secondary winding and having a pair of output terminals;

a switching device having first and second main terminals coupled across the output terminals of said first rectifier, and a control terminal;

control signal generating means operative regardless of the condition of said AC power source for applying periodic control signals to said control terminal of said switching device to alternately render said switching device conductive and nonconductive between said main terminals thereof, the frequency of said control signals being substantially higher than the frequency of said AC power source, said control signals having a variable duty cycle;

a pair of output terminals adapted for connection to a load;

an energy storage transformer having a primary winding and a secondary winding,
one terminal of the primary winding of said energy storage transformer being coupled to said first main terminal of said switching device,
another terminal of the primary winding of said energy storage transformer being adapted to be connected to a DC power source;
a second rectifier and a filter coupled between said secondary winding of said energy storage transformer and said output terminals;
said energy storage transformer transferring energy to said load via the secondary winding thereof, said second rectifier and said filter when said switching device is nonconductive between the main terminals thereof; and
a first capacitor coupled to said primary winding of said energy storage transformer for (i) receiving energy from said AC power source via said power transformer and first rectifier when the voltage of said AC power source is at least equal to a predetermined threshold value, and (ii) receiving energy from said DC power source when the voltage of said AC power source is below said predetermined threshold value,
said first capacitor receiving energy when said switching device is nonconductive and transferring energy to said energy storage transformer when said switching device is conductive.

2. The power supply according to claim 1, wherein said DC power source is a rechargeable battery, further comprising means coupled to said energy storage transformer for charging said battery with energy from said AC power source.

3. The power supply according to claim 1, wherein said DC power source has positive and negative terminals, one of said DC power source terminals being adapted to be connected to a main terminal of said switching device.

4. The power supply according to claim 3, wherein the negative terminal of said DC power source is adapted to be connected to a main terminal of said switching device.

5. The power supply according to claim 1, further comprising a programmed current feedback circuit responsive to the voltage across said output terminals and to the current through said switching device between the main terminals thereof, said current feedback circuit being coupled to said control signal generating means for varying the duty cycle of said control signals to maintain (i) the voltage across said output terminals at a predetermined desired value and (ii) the peak current through said switching device at a preset constant value.

6. The power supply according to claim 5, wherein said current feedback circuit comprises:
a first comparator for providing a first difference signal corresponding to the difference between the voltage across said output terminals and a reference voltage;
a current sensing transformer having a primary winding in series with the main electrodes of said switching device, and a secondary winding;
a second comparator coupled to said first comparator and the secondary winding of said current sensing transformer for providing a duty cycle control signal corresponding to the difference between the current through said switching device and said first difference signal; and
means for coupling said duty cycle control signal to said control signal generating means.

7. The power supply according to claim 1, further comprising a second primary winding on said energy storage transformer, and a second capacitor coupled to said second primary winding, said DC power source and a main electrode of said switching device, for transferring energy from said power sources to said energy storage transformer.

8. An uninterruptible power supply, comprising:
a power transformer having a primary winding adapted to be connected to an AC power source, and a secondary winding;
a DC power source comprising a rechargeable battery;
means for charging said battery with energy from said AC power source;
a first rectifier connected to said secondary winding and having a pair of output terminals;
a switching device having first and second main terminals coupled across the output terminals of said first rectifier, and a control terminal;
control signal generating means operative regardless of the condition of said AC power source for applying periodic control signals to said control terminal of said switching device to alternately render said switching device conductive and nonconductive between said main terminals thereof, the frequency of said control signals being substantially higher than the frequency of said AC power source, said control signals having a variable duty cycle;
a pair of output terminals adapted for connection to a load;
an energy storage transformer having a primary winding and a secondary winding,
one terminal of the primary winding of said energy storage transformer being coupled to said first main terminal of said switching device,
another terminal of the primary winding of said energy storage transformer being adapted to be connected to said DC power source;
a second rectifier and a filter coupled between said secondary winding of said energy storage transformer and said output terminals;
said energy storage transformer transferring energy to said load via the secondary winding thereof, said second rectifier and said filter when said switching device is nonconductive between the main terminals thereof;
a first capacitor coupled to said primary winding of said energy storage transformer for (i) receiving energy from said AC power source via said power transformer and first rectifier when the voltage of said AC power source is at least equal to a predetermined threshold value, and (ii) receiving energy from said DC power source when the voltage of said AC power source is below said predetermined threshold value,
said first capacitor receiving energy when said switching device is nonconductive and transferring energy to said energy storage transformer when said switching device is conductive; and
a programmed current feedback circuit responsive to the voltage across said output terminals and to the current through said switching device between the main terminals thereof, said current feedback circuit being coupled to said control signal generating means for varying the duty cycle of said control signals to maintain (i) the voltage across said output terminals at a predetermined desired value and (ii) the peak current through said switching device at a preset constant value.

9. The power supply according to claim 8, wherein said battery has positive and negative terminals, one of said battery terminals being adapted to be connected to a main terminal of said switching device.

10. The power supply according to claim 9, wherein the negative terminal of said battery is adapted to be connected to a main terminal of said switching device.

11. The power supply according to claim 8, further comprising a second primary winding on said energy storage transformer, and a second capacitor coupled to said second primary winding, said DC power source and a main electrode of said switching device, for transferring energy from said power sources to said energy storage transformer.

12. An uninterruptible power supply, comprising:
a power transformer having a primary winding adapted to be connected to an AC power source, and a secondary winding;
a DC power source;
a first rectifier connected to said secondary winding and having a pair of output terminals;
a switching device having first and second main terminals coupled across the output terminals of said first rectifier, and a control terminal;
control signal generating means operative regardless of the condition of said AC power source for applying periodic control signals to said control terminal of said switching device to alternately render said switching device conductive and nonconductive between said main terminals thereof, the frequency of said control signals being substantially higher than the frequency of said AC power source, said control signals having a variable duty cycle;
a pair of output terminals adapted for connection to a load; and
an energy storage transformer having a primary winding and a secondary winding,
the primary winding of said energy storage transformer being coupled to said first main terminal of said switching device and being adapted to be connected to said DC power source,
the secondary winding of said energy storage transformer being coupled to said output terminals,
said energy storage transformer (i) receiving energy from said AC power source via said power transformer and first rectifier when the voltage of said AC power source is at least equal to a predetermined threshold value, and (ii) receiving energy from said DC power source when the voltage of said AC power source is below said predetermined threshold value.

13. The power supply according to claim 12, further comprising a programmed current feedback circuit responsive to the voltage across said output terminals and to the current through said switching device between the main terminals thereof, said current feedback circuit being coupled to said control signal generating means for varying the duty cycle of said control signals to maintain (i) the voltage across said output terminals at a predetermined desired value and (ii) the peak current through said switching device at a preset constant value.

14. The power supply according to claim 13, wherein said current feedback circuit comprises:
a first comparator for providing a first difference signal corresponding to the difference between the voltage across said output terminals and a reference voltage;
a current sensing transformer having a primary winding in series with the main electrodes of said switching device, and a secondary winding;
a second comparator coupled to said first comparator and the secondary winding of said current sensing transformer for providing a duty cycle control signal corresponding to the difference between the current through said switching device and said first difference signal; and
means for coupling said duty cycle control signal to said control signal generating means.

15. An uninterruptible power supply, comprising:
inductive means for coupling power from an AC power source;
a rectifier coupled to said inductive means;
a switching device having first and second main terminals coupled to said rectifier, and a control terminal;
control signal generating means for applying periodic control signals to said control terminal of said switching device to alternately render said switching device conductive and non-conductive between said main terminals thereof, said control signals having a variable duty cycle;
a pair of output terminals adapted for connection to a load; and
an energy storage transformer having a primary winding and a secondary winding,
said primary winding being coupled to said first main terminal of said switching device and being adapted to be coupled to a non-periodic power source,
said secondary winding being coupled to said output terminals,
said energy storage transformer (i) receiving energy from said AC power source via said inductive means when the voltage of said AC power source is at least equal to a predetermined threshold value, and (ii) receiving energy from said non-periodic power source when the voltage of said AC power source is below said predetermined threshold value.

16. The power supply according to claim 15, further comprising a programmed current feedback circuit responsive to the voltage across said output terminals and to the current through said switching device between the main terminals thereof, said current feedback circuit being coupled to said control signal generating means for varying the duty cycle of said control signals to maintain (i) the voltage across said output terminals at a predetermined desired value and (ii) the peak current through said switching device at a preset constant value.

17. The power supply according to claim 16, wherein said current feedback circuit comprises:
a first comparator for providing a first difference signal corresponding to the difference between the voltage across said output terminals and a reference voltage;

a current sensing transformer having a primary winding in series with the main electrodes of said switching device, and a secondary winding;

a second comparator coupled to said first comparator and the secondary winding of said current sensing transformer for providing a duty cycle control signal corresponding to the difference between the current through said switching device and said first difference signal; and means for coupling said duty cycle control signal to said control signal generating means.

* * * * *